Sept. 8, 1953

S. J. SMITH ET AL 2,651,361

TIMING MECHANISM

Filed Oct. 24, 1951

INVENTORS.
Stanley J. Smith
Jack Isreeli
BY Fraser, Myers and Manley.
ATTORNEYS.

Sept. 8, 1953

S. J. SMITH ET AL 2,651,361

TIMING MECHANISM

Filed Oct. 24, 1951

INVENTORS.
Stanley J. Smith
Jack Isreeli
BY Fraser, Myers and Manley.
ATTORNEYS.

Patented Sept. 8, 1953

2,651,361

UNITED STATES PATENT OFFICE 2,651,361

TIMING MECHANISM

Stanley J. Smith, Ossining, and Jack Isreeli, New York, N. Y., assignors to Simmonds Aerocessories Inc., Tarrytown, N. Y., a corporation of New York Application October 24, 1951, Serial No. 252,878

11 Claims. (Cl. 161—1)

This invention relates generally to timing mechanisms and is more specifically concerned with time-delay apparatus of the type particularly of use in the aviation and similar industries.

Some of prerequisites of time-delay apparatus of this specific type are light-weight, dependability, compact structure, positive action and long operating life and it is an object of the present invention to provide a new and useful time mechanism which possesses some or all of these prerequisites.

It is a further object of the invention to provide a time-delay mechanism which is capable of precise adjustment over a wide range of time, for operational control of a control circuit.

Another object of the invention is to provide a servo-mechanism having a precise cyclic control during a preselected time interval, the mechanism being particularly suited for use with airborne mechanisms.

Still another object of the invention is to provide a time-delay servo-mechanism for aircraft and equivalent use where the accuracy of control is maintained irrespective of the attitude assumed during flight of the aircraft and irrespective of variation of ambient conditions.

In the operation of some types of aircraft, it is common practice to utilize hydraulic power for performing certain functions and for operating certain controls. An example of one such function is the raising and lowering of the landing wheels of the aircraft. In order that the control of such functions shall be always available to an operator, it has been customary to have direct connection of the main source of hydraulic power to the apparatus for performing the function, so that the parts of the apparatus are under constant hydraulic pressure when the hydraulic system is in operation even though the function required of the apparatus may be only occasional, for example, the landing wheel control referred to. This does not provide ideal operating conditions, since the parts of the apparatus are subjected to such hydraulic pressure when not in actual use, causing higher levels of maintenance and replacement to be established.

It is still another important object of the invention to provide specific, new and useful means for controlling the application of hydraulic pressure to such apparatus for performing a periodic or occasional function, in such manner that the hydraulic pressure is only applied when needed and for the period of time necessary only to perform the specific function. This provides that during periods of no demand, the apparatus is relieved of the hydraulic pressure until this is called for by the control mechanism.

In the description hereinafter set forth, the invention will be specifically described with reference to the function of operating a hydraulic device for only the time needed for performing a function, such as control of the landing gear of an airplane, but it is obvious that the application of the timing mechanism of the present invention can be made to any apparatus requiring a delayed timing cycle, as hereinafter set forth, and the reference to the specific form of hydraulic control device, described and illustrated, is purely exemplary and is not to be construed in any way to limit the uses for which the timing mechanism of the invention may be employed.

The accompanying drawings illustrate one manner of bringing said objects into effect.

Of the drawings.

Generally, in practicing the present invention, there is provided a timer mechanism having a plurality of cooperating units including a motor drive unit, a time-delay brake unit and an operating or control unit.

The motor drive unit is adapted to have limited angular movement, preferably in one direction of rotation only, and this angular movement is stepped-up to rotate a brake assembly of any desired form, such as an eddy current brake, sufficiently to give a time-delay function, which function can be varied between wide limits, according to the present invention.

The rotation of the rotor of the motor unit under the delaying action of the brake unit is applied to cause a timed cycle of movement to a linearly moving control member forming part of the operating unit which is adapted to control the operation of one or the other of alternative functions to be performed. The timing mechanism operates under control of master switches which are actuated to cause cyclic operation of the one of said functions in a time preselected therefor, the switches when inactive, being arranged to leave the mechanism in condition to control the other of said functions; whereby occasional operation of said one function can be had by means of said switches, said other function being normally maintained with the mechanism in condition to accept and perform said one function when called upon to do so by actuation of said switches.

In a preferred form, the timing mechanism comprises a motor drive unit which includes a motor having a rotor and stator, the rotor thereof having limited angular movement, of 90° for example, in one direction only, with spring return in the reverse direction. A brake time-delay unit is coupled with the rotor so that the time of completing the limited angular movement is delayed, the delaying mechanism being preferably adjustable to give a range of time cycles for the angular movement of the rotor. The delayed output from the motor controls an electric switching circuit which places a control unit, such as a three-way hydraulic valve, in one position where, for example, the pressure port of the hydraulic valve is in communication with the control port for actuation of a control mechanism and in an alternative position where the control function is dormant, such as with the pressure port of the hydraulic valve being in communication with the return port.

Upon actuation of switching means, the dormant condition is electrically energized to give the control condition for the time determined by the motor and brake delay units, whereafter the dormant condition is again automatically set up.

In case of power failure of the electric supply to the circuit, the apparatus is automatically placed in control condition, in the preferred embodiment of the invention.

One specific application of the timing mechanism of the present invention, which exemplifies its utility and advantages, is in connection with the landing gear of aircraft in order to remove the hydraulic pressure from the actual operating means for swinging the landing gear into and out of landing position during the long periods of non-use, namely, the dormant periods between the occasional periods of operation of the landing gear. By ganging the switching means of the electric time-delay control circuit according to the present invention, with the switching means directly causing the movements of the landing gear, hydraulic power can be supplied to the landing gear controls only when called for and when needed for operation thereof.

Referring now specifically to the drawings, Figs. 1-5, the timing mechanism is housed in a casing 10, preferably of aluminum or other light-weight metal and comprises a timer unit 11 and a valve assembly 12. The timer unit consists of three cooperating elements which together serve to give the time-delay control of the valve unit, as hereinafter brought forth. These elements are: a motor drive unit 13; a brake-delay unit 14; and an operating unit 15.

The motor drive unit 13 comprises a rotor 16 having coil windings 17 and mounted upon a shaft 18 to move same. Shaft 18 is mounted for anti-frictional rotation in ball bearings 19 which are fixedly supported in the casing 10 by brackets 20a and 20b attached to the casing in conventional manner. The stator of the motor comprises a pair of opposed pole pieces 22 and 23 each mounted on the casing 10 by means of ribs 24 and 25 suitably attached to the casing and carrying the pole pieces in fixed position by means of screws 26 which are threaded into bores in the pole pieces. One of said screws comprises a head screw 27 which is adapted to cause association of delay unit 11 and valve assembly 12 by having the head of screw 27 slidable within a groove 28 in the casing of the valve assembly 12 (see Fig. 1). Stator windings 29 are associated with pole pieces 24 and 25 to provide the excitation necessary to cause rotation of the rotor 16.

Figure 4:
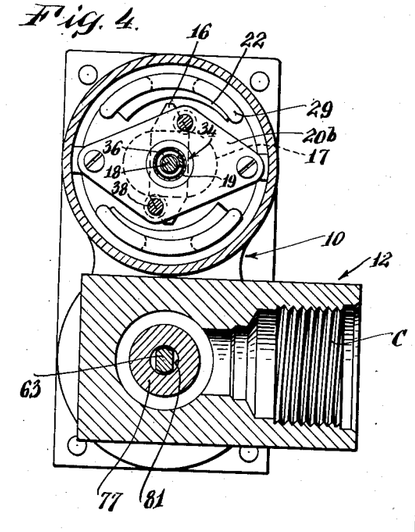
Fig. 4 is a cross-sectional view of the device of Fig. 1, taken along the line 4—4 of Fig. 1.
Figure 5:
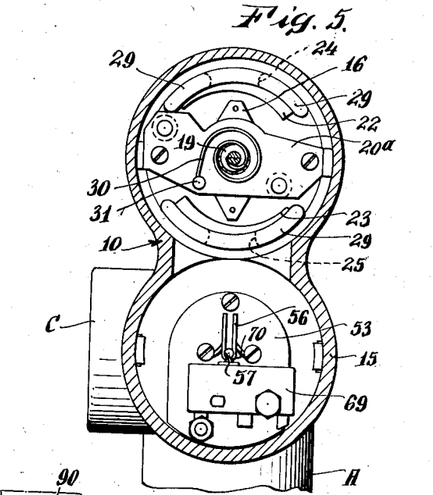
Fig. 5 is a cross-sectional view of the device of Fig. 1, taken along the line 5—5 of Fig. 1.

It is one of the important features of the present invention to provide unidirectional limited angular movement of rotor 16 in an amount which is preselected for the desired conditions of operation of the timing mechanism. To this end, as shown in Figs. 4 and 5, pole pieces 22 and 23 are formed with their exposed faces of limited area and so shaped as to be eccentric to the rotor shaft 18, whereby in one direction of rotary movement of the rotor 16, the air gap between the pole pieces and rotor will diminish its size from a maximum at the starting point to a minimum at the finishing point. The pole pieces 22 and 23 are specifically shown as 90° segments whereby the rotation of the rotor will be only through 90°, to give the limited angular movement desired. Obviously, other angular limits can be given by having eccentric pole pieces 22 and 23 formed as greater or lesser angular segments.

When the motor windings are excited, rotation of rotor 16 through the 90° angular distance will take place, due to tendency of the flux to seek the shortest path across the air gap, and this movement will be unidirectional. Upon disconnection of the exciting current, rotor 16 is returned to starting position by a torsion spring 30 mounted on shaft 18 at one end and fixed to bracket 20a by a stud 31 at the other end, the spring being wound up by angular movement of rotor 16 with sufficient torsion to rotate the rotor back to zero or starting position when the electric current is disconnected. This type of motor avoids the use of commutators and consequent radio interference therefrom.

Normally the lapse of time between start and finish of rotation of rotor 16 will be determined by the characteristics of rotor, stator and operating parts and will be substantially a fixed period of time.

It is another important feature of the present invention to provide a time-delay means in which the time cycle can be varied over a wide range, to suit varying conditions of operation. To this end, brake-delay unit 14 is provided, comprising a gear box 32 which is a step-up transmission device to obtain a number of revolutions at its output for the 90° or ¼ revolution of rotor 16, as an input, the input shaft 33 of gear box 32 being coupled to shaft 18 by a spring clutch 34. Clutch 34 is unidirectional and comprises a helical spring 36 fixed on shaft 18 by clamp 35 to move therewith, spring 36 being twisted in one direction of rotation into gripping contact with shaft 33 which is surrounded by part of the spring, to cause it to follow turning movements of shaft 18. In the reverse direction spring 36 will slip upon shaft 33 and have no driving effect thereon. Thus, the input shaft 33 will follow movements of rotor 16 and the output shaft 37 of gear box 32 will be rotated a number of revolutions, dependent upon the step-up transmission ratio. This ratio can be in the order of 1:250 whereby for ¼ turn input 62 turns output is approximately obtained. To maintain the proper spacing for clutch 34, spacer bars 38 are provided between the input face of the gear box 32 and the bracket 20b.

Figure 1:
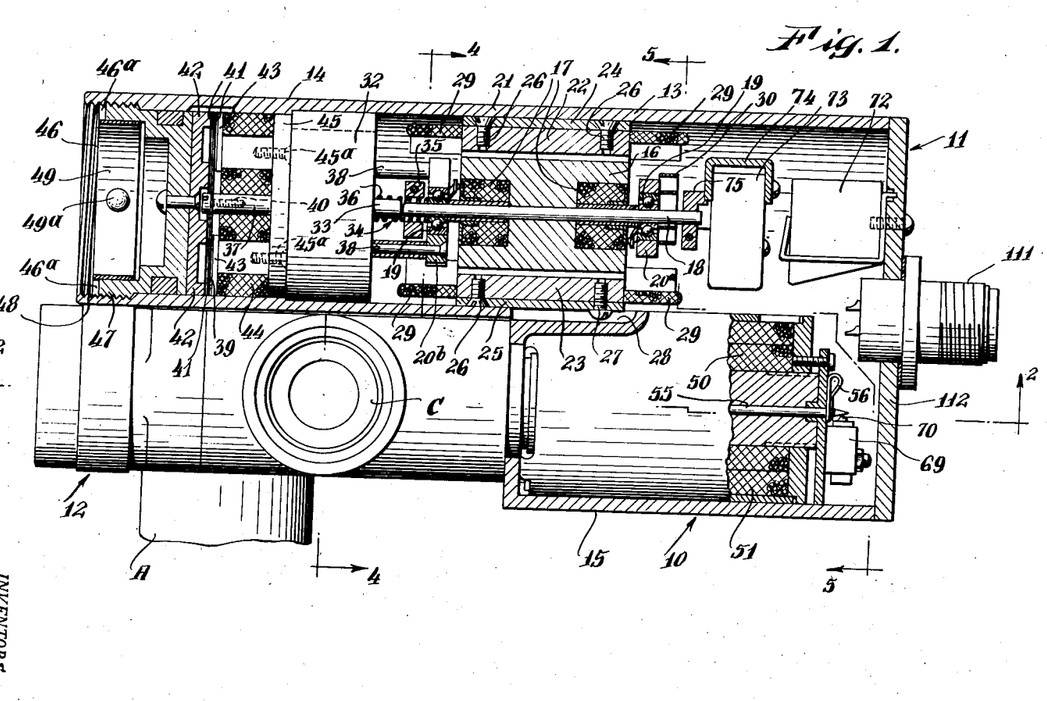
Figure 1 is a plan view with parts in section of a form of timing-device according to the present invention, when used to control hydraulic means for performing a function.

In order to dampen the rotational movements of shaft 37 an eddy current brake system is provided comprising an aluminum disk 39 mounted on the extremity of shaft 37 by a screw 40 which enters a threaded bore in shaft 37. Disk 39 is rotatable within air gaps 41 formed between a plate 42 of magnetic material, pole pieces 43 of an electromagnet having windings 44 and the disk 39. Pole pieces 43 are mounted on another plate 45, also of magnetic material, by screws 45a, plate 45 being conventionally rigidly held by casing 10. When windings 44 are excited, the rotating brake disk 39 will cause an opposing torque to be exerted on its shaft 37 which in turn is exerted onto shaft 18 and rotor 16, whereby to dampen the rate of angular movement thereof. The amount of dampening effect will vary as a function of the magnetic flux across the air gaps 41, so that, by altering the effective width of said air gaps, variation can be made in the damping action. To effect this, plate 42 is riveted to a cylindrical cap member 46 which is internally telescoped within that end of the part of casing 10 which houses the brake-delay unit 14, member 46 being externally screw-threaded as at 47 with threads complementary to an internal screw thread 48 formed in the end of the casing, as shown. Adjustment of the position of plate 42 relative to the pole pieces 43 can thus be made by rotating end cap 46 using a tool therefor which will engage with slots 46a in the cap, thereby varying the damping effect of the eddy current brake system. Graduated scale 49 held in place by rivets 49a assists in easily obtaining the desired adjustment. In Fig. 1, the adjustment of the cap 46 is shown at one extreme where the air gap 41 is at a minimum. By withdrawing the cap from the position shown to widen the air gaps less opposing torque will be applied by the brake and the time required for movement from zero to the 90° position of rotor 16 will be proportionally decreased. By this means adjustment of the time-delay function of the timing mechanism of the present invention can be made to vary the control operation of rotor 16 from one or two seconds to as much as several minutes, depending on the characteristics of the cooperating elements thereof.

Cooperating with the motor drive unit 13 and brake-delay unit 14, hereinbefore described, is the operating unit 15 which acts to control the operation of the units 13 and 14. Unit 15 (Figs. 2 and 3) is arranged within the lower portion of casing 10 and comprises a solenoid assesmly having two hollow circular coils 50 and 51 arranged concentrically within the housing and held therein in conventional manner. Within the inner coil there is provided an element 52 held therein in conventional manner. Element 52 extends part of the way into the coil 50 and has at the end therewithin a frustro-conical seat 54. Seat 54 and element 52 are bored throughout to permit a rod 55 to slide therethrough, bracket 53 being also bored to allow passage of said rod. Rod 55 is spring-urged to project into seat 54, in the position shown in Fig. 2, by a U-shaped spring 56 which embraces the rod in a recess 57 (Fig. 5) therearound and can be flexed out of position by the rod when same is moved to the right of Fig. 2.

Slidingly embraced in a sleeve 58 mounted within the inner coil 50 is a plunger 59 of magnetic material which is adapted to be moved by the magnetic field created when said coils 50 and 51 are excited. The forward end of the plunger has a conical nose 60 which is complementary to the cone-shaped seat 54 and terminates in a button 61 which is screwed into the end of the nose, this button being flat faced to serve as a striker for rod 55. At its other end, plunger 59 is bored, as at 62, to accommodate one end of a rod 63 which is tied to the plunger by a rivet pin 64 traversing the plunger and rod in aligned bores therein.

A spring 65 exerts pressure at one end, through parts 77, 79 and 80, on rod 63 and seats at its other end in a recess 66 formed in a plug 67 held within the housing and having a shoulder 68 forming a stop for movement of the plunger 59, which stop limits the movement of the plunger under action of spring 65 when this expands. Thus when the plunger 59 occupies its seated position of Fig. 3, the spring 65 is compressed and is acting against the magnetic force caused by coils 50 and 51; whereas, when coils 50 and 51 are deenergized, the parts assume the position of Fig. 2 where the spring 65 has relaxed or expanded to cause the plunger to unseat itself from seat 54 and assume its extreme left-hand position.

Figure 2:
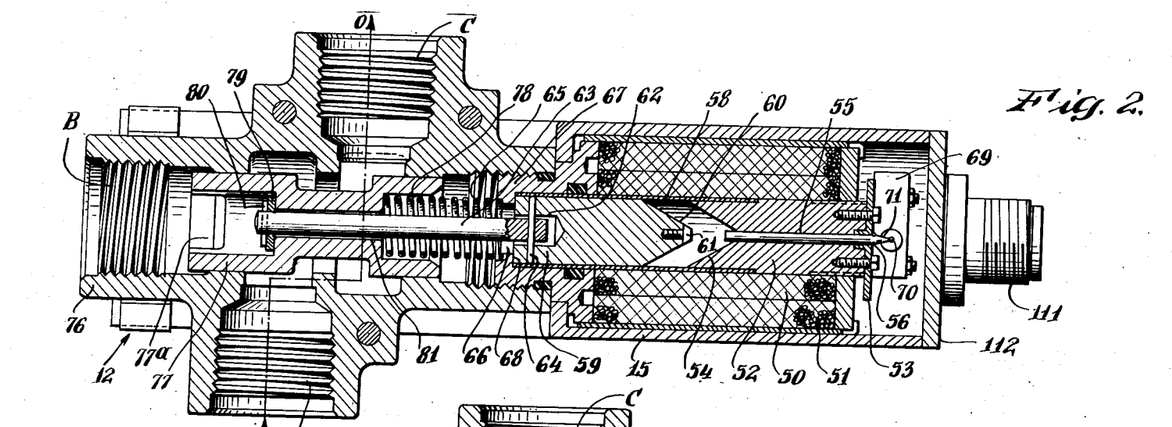
Fig. 2 is a sectional view of the device of Fig. 1, taken along the line 2—2 of Fig. 1.
Figure 3:
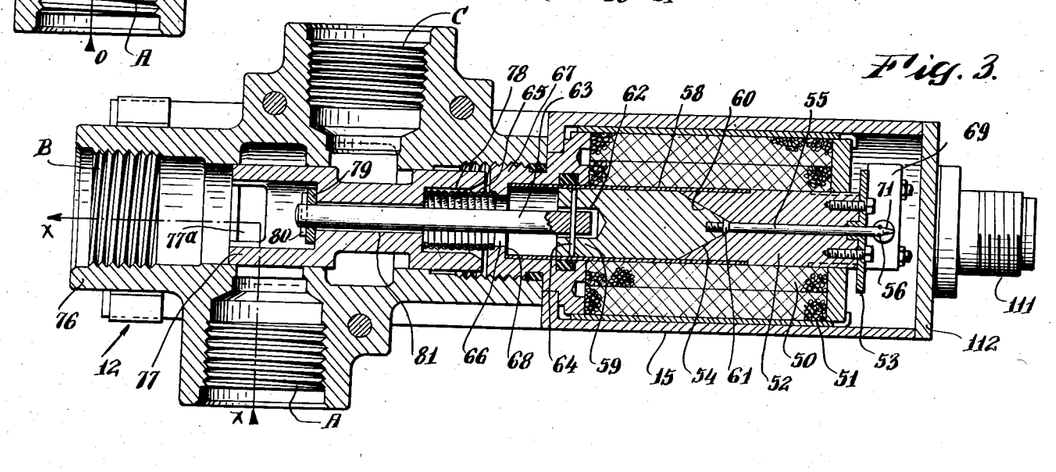
Fig. 3 is a view similar to Fig. 2 but showing the operating parts in an alternative functional position relative to the position of parts in Fig. 2.

Suitably mounted on bracket 53 is a "normally closed" micro-switch 69 having its operating actuator 70 in the path of movement of rod 55, so that, in the position of Fig. 2, the switch is closed and in the position of Fig. 3, the switch has been caused to open by contact of the tapered tip 71 of rod 55 with the lever. Switch 69 is the control switch for the application of power to the motor drive unit 13 and brake-delay unit 14 and, as hereinafter brought out, opening of switch 69, as in Fig. 3, will cause return of rotor 16 to its initial starting position.

In the position of Fig. 3, only one coil 50 is in operation, this being a holding coil to maintain the elements in the position shown. The energizing circuit to the holding coil 50 is controlled by a normally-closed relay switch 72. When relay switch 72 is momentarily opened, as by momentarily opening its operating circuit, the plunger 59 and its associated parts assume the position of Fig. 2 by deenergizing the coil 50 and action of spring 65. Switch 69 is then closed and rotor 16 now turns and the timing-delay cycle has begun.

Coil 51 is normally inoperative and is only utilized as an actuating coil to cause plunger 59 to be pulled back, against the action of spring 65, into the position of Fig. 3, where the holding coil 50 can take over to retain the parts in the position shown. The energizing circuit to the actuating coil 51 is under the control of a normally open switch 73 having an operating lever 74 which can be thrown into switch-on position by an arm 75 mounted on shaft 18 to move with the rotor 16. Thus, at the end of travel position of rotor 16, switch 73 will be closed and will cause energizing of actuating coil 51 to move plunger 59 to the position of Fig. 3. In this position, the spring 56 will cause rod 55 to move to allow switch 69 to open, thereby breaking the motor unit circuit which is then returned to the starting position by spring 30. When this is completed, the timing mechanism is again ready for further cyclic operation.

As hereinbefore set forth, one use to which the timing mechanism can be put is in connection with hydraulic control means, for instance, for aircraft, where the application of hydraulic power need only be occasional, when called for by the pilot or other operator. As specifically illustrated, a valve assembly 12 can be readily controlled by the timing mechanism hereinbefore described. Valve assembly 12 comprises a main housing or cylinder 76 having ports A, B and C. A spool-type valve 77 operated therewithin, said valve having a recess 78 which accommodates one end of spring 65. Valve 77 is attached to rod 63 by a pin 80 which fits in a crosshole in rod 63 and cooperates with a washer 79, the valve being bored at 81 to receive the end of rod 63. Valve 77 slides in valve cylinder or housing 76 in accordance with movements of plunger 59.

In Fig. 2, the holding coil 51 is deenergized and spring 65 controls the parts with the pressure port A in communication with the control port C, the flow of pressure being along the dotted line o—o. In Fig. 3, the holding coil is energized and the plunger 59 is seated, the pressure port A being in communication with the return port B, the flow of pressure being along the dotted line x—x, valve 77 having portions of its end cut away as at 77a to permit this flow.

It should be noted that if power failure occurs, the conditions will be assumed as in Fig. 2, so that the hydraulic control can be operated under such conditions.

This is an important factor when the device is used for aircraft operations particularly, since, if the electric wiring is destroyed or the power supply fails for any reason the parts of the operating unit will assume the position of Fig. 2, with the hydraulic pressure port A in communication with the control port C, whereby the hydraulic device to be controlled, such as the landing gear, can still function despite the crippling of electrical supply. Whether the pilot is aware of the disablement of the electric supply or not, the hydraulic unit can still function because coil 50 will have been deenergized and spring 65 will have placed the operating unit on the pressure to control side through port A to port C.

Figure 6:
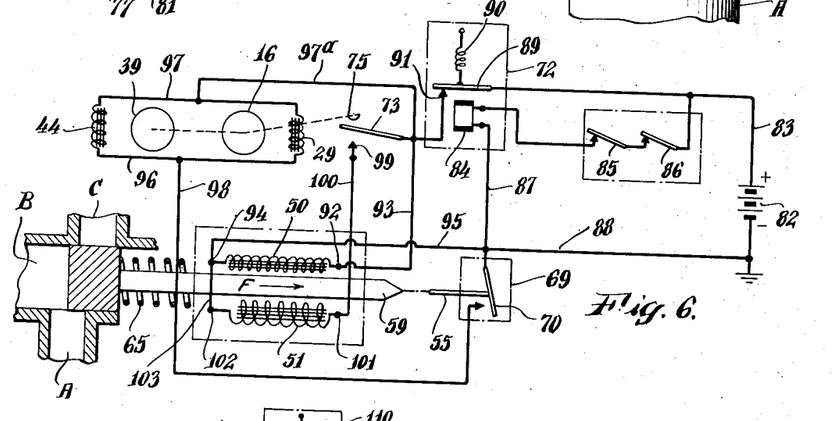
Fig. 6 is a schematic diagram of the timing device according to the present invention, showing the wiring circuit and method of operation thereof.
Figure 7:
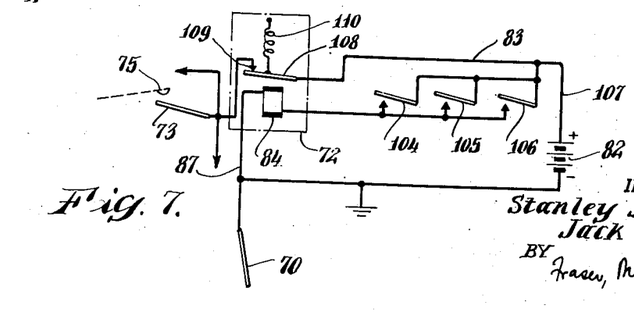
Fig. 7 is a fragmentary schematic diagram of a modification of part of the wiring circuit of Fig. 6.

In order to more clearly explain the operation of the timing mechanism when used for hydraulic control, as specifically illustrated, reference is made to the wiring schematics, Figs. 6 and 7.

Referring to Fig. 6, where like numbers have been given to the parts illustrated in Figs. 1–5 of the drawings, a storage battery 82 or like supply of electric power is shown, having its positive terminal connected by lead 83 to one side of the coil 84 of relay 72 through a plurality of control switches 85 and 86, these being normally closed switches, arranged in series connection with coil 84. The other side of coil 84 is connected by lead 87 to the grounded return lead 88. In this position, coil 84 attracts the relay switch arm 89 of relay 72 holding it, against the spring return 90, against contact 91 which connects with one terminal 92 of holding coil 50 through lead 93. The other terminal 94 of coil 50 is connected to the ground return 88 through lead 95. Thus, with relay 72 in operative condition and switches 85 and 86 closed, holding coil 50 will be in position to hold plunger 59 on its seat, as in Fig. 3, with switches 69 and 73 in open position. The hydraulic flow will thus be in by-pass condition from pressure port A to return port B. If now either or both of switches 85 and 86 are opened, for example, by the pilot or other operator, the relay coil 84 will be deenergized, contact between arm 89 and contact 91 will be broken by spring 90 and holding coil 50 will be deenergized and plunger 59 will move, under urge of spring 65, to the position shown in Fig. 2. This will cause switch 69 to be closed by action of rod 55. Since the switch arm 70 of switch 69 is connected to negative lead 88 and the contact for switch 69 is connected to one side of the common lead 96 for the motor field winding 29 and brake winding 44, this will complete the return connection to the motor and brake units.

The positive common lead 97 for windings 44 and field windings 29 is connected by lead 97a to contact 91. By connecting coils 29 and 44 in parallel, with common leads 96 and 97, fluctuations of input voltage will have no serious effect on the time cycle produced since both motor and brake will be equally affected.

Switches 85 and 86 are of the momentarily-off type, namely, they are lagged or dampened so that they are only opened for a period of time necessary to initiate the function of deenergizing relay 72 and thereafter return automatically to closed position as in Fig. 6. Therefore, when switch 69 completes the negative or return circuit for the motor-brake unit, the positive side thereof is connected to the positive lead 83 through the now closed switch 89–91. The motor-brake assembly now commences to rotate as previously described.

After the time cycle has been completed, the arm 75 on shaft 18 will be in position to close switch 73, the contact 99 of which is connected by lead 100 to one terminal 101 of actuating coil 51, the other terminal 102 being connected by lead 103 to lead 95 and ground return 88. By this means, the actuating coil 51 is energized adding its magnetic influence to the holding coil 50, which is now energized by the closing of arm 89 of relay 72 but which alone is not powerful enough to overcome the spring 65 and the inertia in the system and can only serve to hold the plunger against its seat when it has been seated. The plunger now moves to the right, from the position of Fig. 2 to the position of Fig. 3, the rod 55 opens switch 69, thereby breaking the return lead 98 and deenergizing the windings 44 and 29. The motor-brake unit will now be at rest, ready for further actuation, the parts being in the condition schematically shown in Fig. 6.

In Fig. 7, a modified form of circuit is shown in which series switches 85 and 86 are replaced by parallel switches 104, 105 and 106 which are connected on one side by a lead 107 to the positive side of battery 82 and on the other side to the coil 84 of relay 72, the other terminal of coil 84 going to the negative grounded side of the battery by lead 87. Switches 104–6 are normally open lag-type switches and are momentarily closed to activate coil 84 to draw arm 108 away from contact 109 against the action of spring 110, thereby causing the holding coil 50 to be deenergized as previously described. The holding circuit for coil 50 in the modified form of Fig. 7 is by contact of arm 108 under pressure of spring 110 with contact 109 when the relay coil 84 is deenergized. Thus, the form shown in Fig. 7 obviates the necessity of having coil 84 energized during the long periods of non-use of the control, only holding coil 50 being energized during such inactive periods.

The operation of the device can be best described in connection with its application to control of hydraulic apparatus for operating the landing gear of an airplane, as exemplified hereinbefore. Assuming the aircraft to be airborne with the landing wheels retracted, the timing mechanism according to the present invention will have the timing unit 11 at rest with motor unit 13 at rest and deenergized.

When the pilot decides to lower the landing wheels upon approach to a landing, it is necessary to change the conditions from those of Fig. 3 to those of Fig. 2 to first apply pressure from port A to control port C and thence to the hydraulic system controlling operating of the landing wheel raising and lowering mechanism.

In the control circuit of Fig. 6, switches 85 and 86 are normally closed and relay coil 84 is normally energized to hold arm 89 upon the contact 91, against spring pressure of spring 90. If the crewman responsible for the landing gear operation now opens either switch 85 or 86, relay 72 will have its coil 84 deenergized and arm 89 will be spring urged out of contact with contact 91. This will break the circuit to holding coil 50 (through lead 93) causing spring 65 to draw plunger 59 to the left into the position of Fig. 2. Thus, pressure port A now communicates with control port C and the landing gear system is in condition for operation in conventional manner.

Since switches 85 and 86 are of the momentarily-off type, they will return to the position in Fig. 6 after a brief lag of a predetermined time sufficient to initiate the action just described. Now, relay 72 is again energized as is holding coil 50 but the parts remain in the position of Fig. 2 because coil 50 is incapable, of itself, of overcoming the power of spring 65. Due to the closing of switch 69 by movement of rod 55 to the left in Fig. 2, the motor and brake windings 29 and 44 will remain excited through lead 98 until the time-cycle determined by the brake delay unit 14 is completed and switch 73 is closed onto contact 99 through arm 75. Closing of switch 73 causes actuating coil 51 to be energized through lead 100 whereby the plunger 59 is moved to the right, to the position of Fig. 3. In this position, switch 69 is again open, disconnecting the motor windings 29 and brake windings 44, thus stopping the motor. Spring 30 (Figs. 4 and 5) now returns rotor 16 to zero, or starting position, thus removing switch 73 from contact 99, so that actuating coil 51 is disconnected from the battery circuit (lead 83). The parts are now all in the position of Fig. 3, ready for further operation when called for.

While the parts are in the position of Fig. 3, should power failure occur for any reason, the parts will immediately move to the position of Fig. 2, since relay 72 and holding coil 50 will be deenergized and thus spring 65 will come into action. This places the hydraulic system in operative position from pressure port A to control port C, so that the landing gear can be operated. Thus, the timing mechanism of the present invention has a further safety factor since under power failure conditions the unit will assume a position of positive control and will not prevent operation of the function being controlled, such as the landing gear operations.

When using the circuit of Fig. 7, any of the normally open switches 104, 105 or 106 can be manually closed when it is desired to lower the landing wheels, this causing energizing of relay 72 to move arm 108 from contact 109 and thus break the holding coil circuit. Since the switches 104, 105 and 106 are of the normally-open type which after being momentarily closed open again after a predetermined time lag, the switches will again open to deenergize relay 72 and energize holding coil 50 through closing of arm 108 onto contact 109 as in Fig. 7, the rest of the operation then being as given above.

While hereinbefore reference has been made to a drive unit 13 having a rotor 16 and stator 22 and 23, it is possible to use any equivalent electro-responsive device for driving purposes. For example, the limited angular movement of rotor 16 can be replaced by linear movement of a driven member actuated by an electro-magnet driver, such as a solenoid coil and plunger and damping means equivalent to the brake unit 14 can be provided therefor, within the spirit and scope of the present invention.

Obviously, a plurality of timer-mechanisms according to the present invention can be employed for multiple action of functions. For example, where positive wheels-up—wheels-down procedure for landing gear is required, one timer-mechanism can be used for the wheels-up function and a separate timer-mechanism can be used for the wheels-down function. In a like manner, where several gun turrets are to be moved into and out of the aircraft fuselage, each turret may have its individual timer-mechanism with interlinking of operational circuits so that any one or all of the turrets may be moved into and out of firing position.

Any other function which is hydraulically controlled may be governed by the timer-mechanism hereinbefore set forth and described, whereby to remove the hydraulic pressure from the apparatus to be hydraulically controlled until same is actually needed and to only apply such pressure while it is needed.

While the timing mechanism has been specifically described with respect to hydraulic controls which are only utilized when specifically needed, it is obvious that various modifications and uses of the timing mechanism can be had within the spirit and scope of the invention as described, and the claims appended hereunto. For example, spring 65 may be operated so that the positions in Figs. 2 and 3 are reversed operations, whereby in Fig. 2 the holding coil would be operative against the spring, to cause one control condition, and in Fig. 3 the holding coil would be deenergized and the plunger spring-urged to the alternative control condition.

Furthermore, while the timing mechanism has been shown and described as a composite assembly with its several cooperating parts of motor drive unit 13, brake-motor unit 14, operating unit 15 and valve assembly 12 all within one casing 10, it is obvious that one or more of these units may be remotely arranged without changing the operation or cooperation of parts.

When using the time mechanism as a composite assembly within one casing, the various electrical connections to the coils, switches and other parts can be conveniently brought from externally of the assembly for internal wiring by a conventional form of electrical multi-pin connector 111 suitably mounted in an end plate 112 fitted over one end of casing 10.

The advantages in use of time-delay mechanism of the type generally set forth are many, particularly in aircraft and similar uses. The assembly is light-weight, compact and substantially fool-proof. It lends itself to operation in any physical position relative to any attitude of the aircraft. It can operate on a small amount of power, such as the 22 to 30 volts of D. C. current usually available on aircraft. The motor unit may be of the non-commutator type, eliminating dangers from sparking. It will operate under great variations of ambient conditions. By using a control unit according to this invention the hydraulic pressure, which may be as high as 3000 p. s. i., can be removed from control apparatus such as that used to raise and lower landing gear or expose and withdraw gun turrets from the aircraft, until such time as the function or operation is demanded, when by simply closing a switch, the control means is put in service in the hydraulic system for use for one or more control functions.

We claim:

1. A timing mechanism comprising in combination, a control actuating means having two positions of control; a spring cooperating with said actuating means and biasing it to one of said positions of control; electro-magnetic means, including a solenoid holding coil, for positively holding said actuating means in one control position against a spring bias when energized; means for deenergizing said electro-magnetic means to permit said actuating means to occupy the other control position under said spring bias; an electric motor having a rotor and a stator; means to limit the angular movement of said rotor in one direction only to 90°; damping means including an eddy current brake, cooperating with said motor to delay the time-cycle during which said rotor moves through its limited angular displacement; means to adjust the damping means by varying the air gap in which the eddy current brake moves to preselect the delay cycle of said motor; means associated with said rotor to maintain said actuating means in said other control position during said motor time-delay cycle; and automatic means to return said actuating means to said one control position after the time-delay cycle has ended, including an actuating solenoid coil acting to move said actuating means, and a switch located in the circuit of said activating solenoid coil and closed by said rotor at its limit of angular movement.

2. A timing mechanism comprising in combination a control member having a dormant and an active control position; electro-magnetic means, including a solenoid holding coil, to hold said control member normally in said dormant position; an electric motor having angular rotation of its rotor of about 90° in one direction only; delay means including an eddy current brake rotating in an air gap and driven by said motor to delay the time-cycle of angular movement; means to adjust the air gap of said brake to vary said time-cycle; switching means for deenergizing said electro-magnetic holding coil momentarily and thereafter re-energize same; means for moving said control member to active position when said electro-magnetic means is deenergized comprising a spring, said spring being stronger than the holding coil, thereby preventing said control member from moving from said active position during the time-delay cycle of rotary movement; means for deenergizing said motor at the end of said cycle to stop same; a torsion spring for returning said rotor to starting position when deenergized; a solenoid actuating coil cooperating with said control member and when energized exerting a force stronger than said first-mentioned spring; and a switch closed momentarily by said rotor at the end of its rotation and located in the circuit of said actuating coil.

3. A timing mechanism comprising in combination an electro-magnetic response member having a dormant and an active control position; electro-magnetic means including a solenoid holding coil to hold said response member normally in said dormant position; an electric motor having unidirectional driving angular rotation of less than 360° and spring loaded rotation in the opposite direction; a brake-delay driven by said motor and applying an opposing torque to delay the time cycle of angular movement; means to vary the opposing torque of said brake to vary said time-cycle means; switching means operated by said response member for deenergizing said electro-magnetic holding coil momentarily; a coiled spring acting on said response member to move same to active position when said electro-magnetic means is deenergized, said coiled spring being strong enough to prevent said response member from moving from said active position under urge of the re-energized holding coil during the time-delay cycle of rotary movement; switch means for deenergizing said motor at the end of said cycle operated by movement of said response member to dormant position; and an actuating coil for said solenoid momentarily energized in one position of said motor for moving said control member into dormant position against action of said spring to cause said response member to be held there by said electro-magnetic holding coil.

4. A timing mechanism comprising in combination a control member adapted to be moved in either an active or a dormant position; electro-magnetic means including a solenoid and an electro-magnetic responsive plunger for moving said control member; a holding coil for said solenoid; a relay for maintaining said holding coil energized to maintain said control member in one of its positions; master switching means for governing the energizing of said holding coil and said relay; mechanical means for moving said control member to the other position when said holding coil is deenergized; an electric motor having a rotor and stator, said rotor having limited rotation and in one direction of rotation only when excited; means moved by rotation of said rotor for storing up sufficient force to return the rotor to its starting point in the other direction of rotation when the motor is deenergized; a brake driven by said rotor; an actuating coil for said solenoid acting with said holding coil to move said plunger and control member to said one position against said mechanical means; a switch operated by said rotor to cause excitation of said actuating coil; a switch actuated by said control member when in said one position to deenergize said motor, and switch means for energizing said holding coil and relay while said motor is energized and prior to the excitation of said actuating coil.

5. A timing mechanism comprising in combination a control member adapted to be moved in either an active or a dormant position; electro-magnetic means including a solenoid and an electro-magnetic responsive plunger for moving said control member; a holding coil for said solenoid; a normally-on relay for maintaining said holding coil energized and said control member in one of its positions; normally-on switching means for governing the energizing of said holding coil and said relay; spring means for moving said control member to the other position when said holding coil is deenergized by opening said switching means; an electric motor having a rotor and stator, said rotor having limited rotation of less than 360° and moving in one direction of rotation only when excited; an eddy current brake moving in an air gap and driven by said motor through a step-up speed transmission gear; means to vary the area of the air gap to vary the time-delay cycle of the motor; an actuating coil for said solenoid acting with said holding coil to move said plunger and control member to said one position; a normally-open switch operated in one position of the motor to be closed to energize said actuating coil momentarily; and a normally closed switch opened by said control member when held in said one position, said switch deenergizing said motor.

6. A timing mechanism comprising in combination a control member adapted to be moved in either an active or a dormant position; electro-magnetic means including a solenoid and an electro-magnetic responsive plunger for moving said control member; a holding coil for said solenoid; a normally-off relay for maintaining said holding coil energized and said control member in one of its positions; normally-off switching means for governing the energizing of said holding coil and said relay; spring means for moving said control member to the other position when said holding coil is deenergized by closing said switches to energize said relay; an electric motor having a stator and rotor, said rotor having limited rotation of less than 360° and in one direction of rotation only when excited; an eddy current brake moving in an air gap and driven by said rotor through a step-up speed transmission gear; means to vary the area of the air gap, to vary the time-delay cycle of the rotor; an actuating coil for said solenoid acting with said holding coil to move said plunger and control member to said one position; a normally-open switch operated in one position of the rotor to be closed to energize said actuating coil momentarily; and a normally-closed switch opened by said control member when held in said one position, said switch causing deenergizing said rotor.

7. A timing mechanism comprising in combination a control member adapted to be moved in either an active or a dormant position; electro-magnetic means including a solenoid and plunger for moving said control member; a holding coil for said solenoid; a normally-on relay for maintaining said holding coil energized and said control member in one of its positions; switching means for governing the energizing of said holding coil and said relay; spring means for moving said control member to the other position when said holding coil is deenergized; an electric motor having a rotor with means to limit rotation of said rotor to less than 360° and in one direction of rotation only when excited; a torsion spring moved by rotation of said rotor to be wound up thereby with sufficient force to return the rotor to its starting point in the other direction of rotation when deenergized; an eddy current brake moving in an air gap and driven by said rotor through a step-up speed transmission gear; means to adjust the area of the air gap to vary the time-delay cycle of the rotor; an actuating coil for said solenoid acting with said holding coil to move said plunger and control member to said one position; a switch operated in one position of the rotor to be closed and exciting said actuating coil momentarily; a normally closed switch actuated by said control member when in said one position to cause deenergizing of said rotor and switch means for energizing said holding coil and relay while said rotor is running and prior to the excitation of said actuating coil.

8. In combination with a control actuating means having an active and a dormant position and means for biasing said actuating means to its active position; a first circuit including a current source, a switch, and an electro-magnet with a movable core operably connected to said actuating means to overcome said biasing means and to move said actuating means to its dormant position when said switch is closed and said electro-magnet is energized; a second circuit including an electrical time delay device automatically operable upon movement of said actuating means to its active position to permit such position to be maintained for a predetermined time interval, and switch means associated with such time delay device and operable at the end of such predetermined interval to close said first circuit, to reenergize said electro-magnet and to move said actuating means to its dormant position; whereby said actuating means will be maintained in active position for a predetermined time interval in the event the electric circuit should not fail, and will be retained indefinitely in active position in the event the electric circuit should fail.

9. In combination with a control actuating means having an active and a dormant position and spring means for biasing said actuating means to its active position; a first circuit including a current source, a switch, and an electro-magnet with a movable core operably connected to said actuating means for overcoming said spring biasing means and for moving said actuating means to its dormant position when said switch is closed and said electro-magnet is energized; a second circuit including a switch closed by said actuating means in its active position, a motor the rotor of which is movable through an angular displacement of less than one complete revolution, and an electrical brake for said rotor serving to delay the normal time cycle during which said rotor moves through its limited angular displacement, a normally-open switch closed by said rotor at the end of its predetermined angular displacement to close said first circuit and thereby to re-energize said electro-magnet and to restore said actuating means to its dormant position; whereby said actuating control means, in the absence of electrical failure, normally is held in dormant position and is moved to and maintained in active position only for a predetermined time interval, and in the event of circuit failure said control actuating means is moved to and maintained in active position.

10. In combination with a control valve having a pressure port for receiving fluid under pressure, a control port for delivering such fluid to a control actuating means, a return port, and a movable valve element having an active and a dormant position, said valve element in its active position bringing said pressure port and said control port into communication and in its dormant position bringing said pressure port and said return port into communication; spring means normally biasing said valve element to its active position; a first circuit including a switch, a current source and an electro-magnet having a movable core operably connected to said valve element to overcome the bias of said spring and to move said valve element to and hold it in said dormant position when said switch is closed and said electro-magnet is energized; a second circuit including an electrical time delay device automatically operable upon movement of said valve element to its active position to permit such position to be maintained and for fluid to flow from said source to said control port for a predetermined time interval, a switch means associated with such time delay device and operable at the end of such predetermined interval to close said first circuit, to reenergize said electro-magnet and to move said valve element to its dormant position, whereby said pressure port is connected to said return port until the switch of the first circuit is again opened or there is an electrical failure of said circuit.

11. In combination with a valve having a casing provided with pressure, return and control ports, a movable valve member cooperating with said casing for connecting the pressure port to either the return port or the control port, and means for biasing said valve member to the position in which said pressure and control ports are connected; an electro-magnet having holding and actuating coils and a movable core connected to said valve member; a switch opened by said core when the core has been magnetically actuated; a normally-open switch located in the circuit of said actuating coil; electrical means for temporarily closing said last mentioned switch after a time interval following the closing of the switch operated by said core; a normally-closed switch through which current is supplied to said holding coil, and to said actuating coil when said normally-open switch is closed; and means for temporarily opening said normally-closed switch; whereby said valve member is moved to and held in the position in which said pressure and return ports are connected, and upon the temporary opening of said last-mentioned switch said valve member is permitted to move for a limited time to the position in which said pressure and control ports are connected.

STANLEY J. SMITH.
JACK ISREELI.

References Cited in the file of this patent

UNITED STATES PATENTS

| Number | Name | Date |
|---|---|---|
| 2,143,692 | Haar | Jan. 10, 1939 |
| 2,163,419 | Warren | June 20, 1939 |
| 2,223,207 | Ellis | Nov. 26, 1940 |
| 2,388,686 | Habig | Nov. 13, 1945 |